April 8, 1947.  O. BJERING ET AL  2,418,691

MACHINE FOR EMPTYING AND WASHING CONTAINERS

Filed March 14, 1944  8 Sheets-Sheet 1

Inventors
OLAV BJERING
R. K. BELNAP Jr.

By Rule and Hoge,
Attorneys

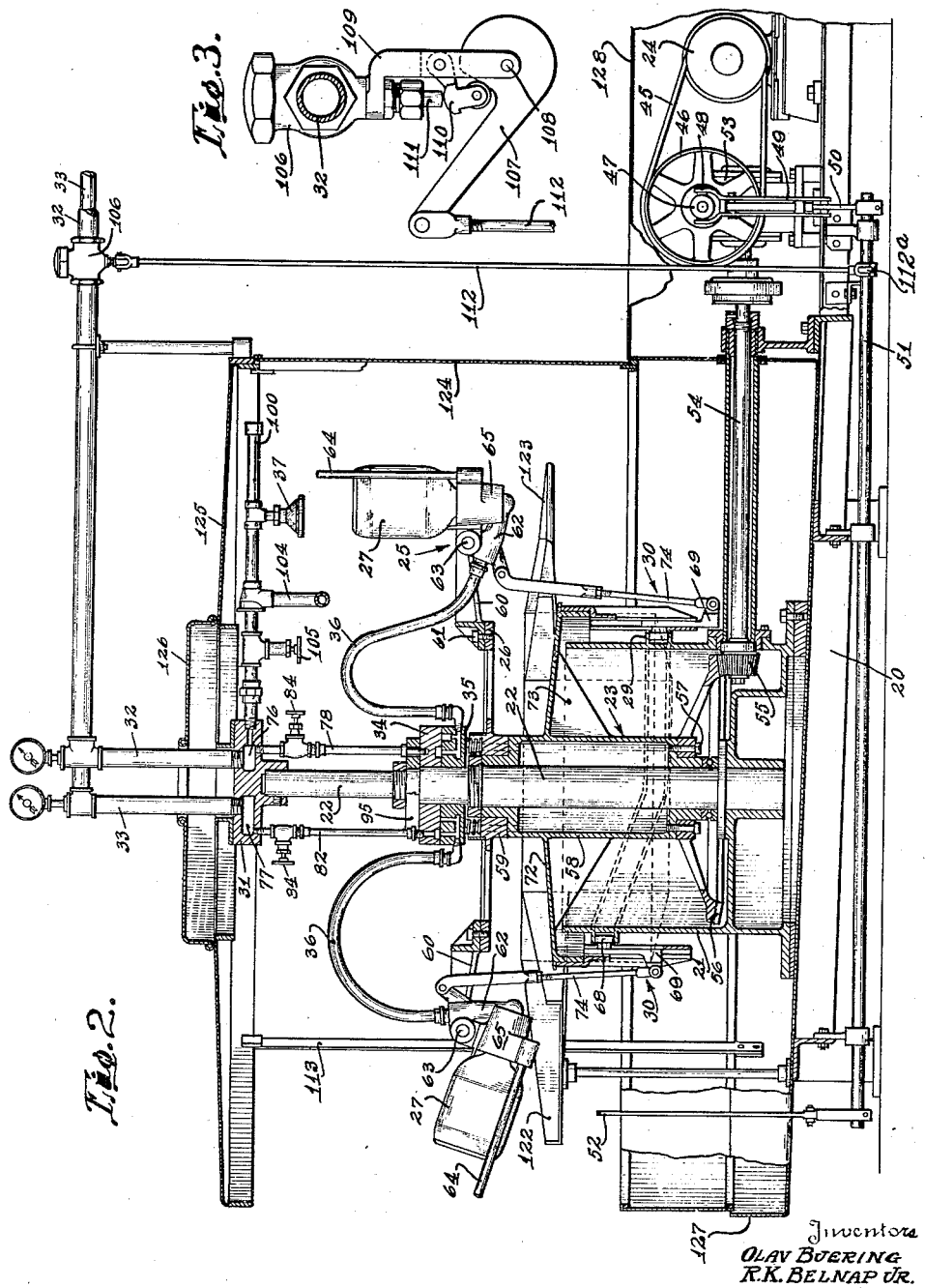

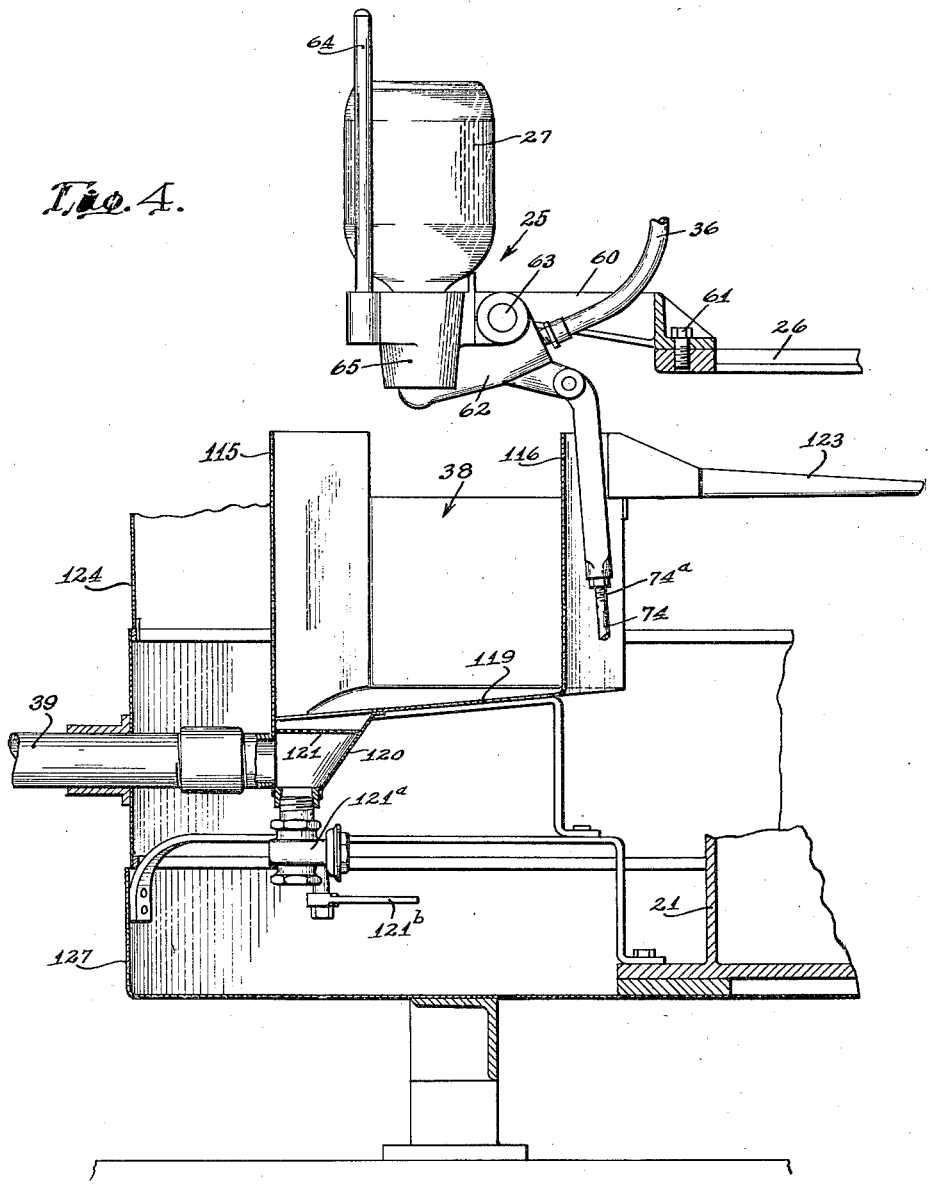

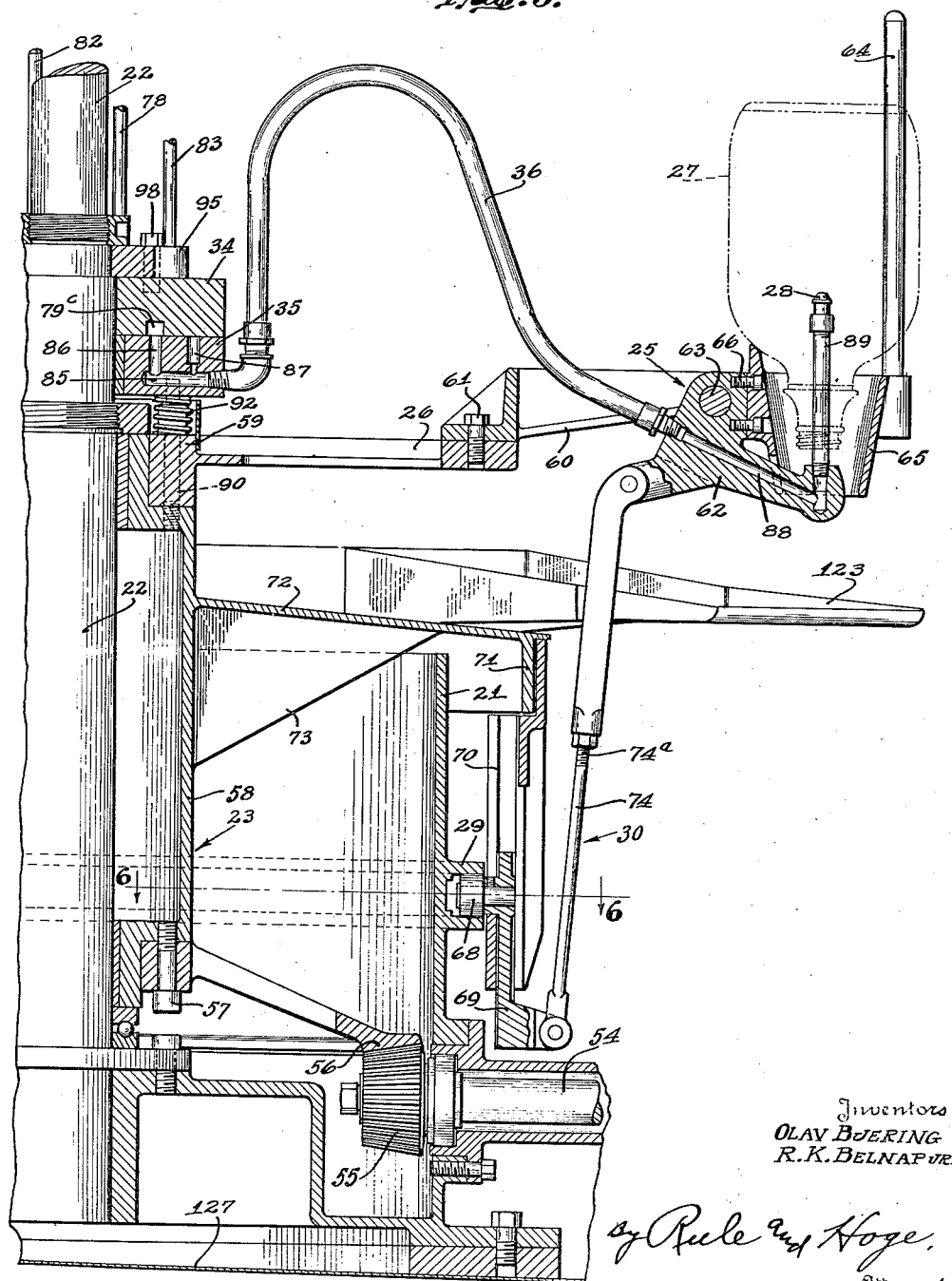

April 8, 1947.　　　　O. BJERING ET AL　　　　2,418,691
MACHINE FOR EMPTYING AND WASHING CONTAINERS
Filed March 14, 1944　　　　8 Sheets-Sheet 6

Inventors
OLAV BJERING
R. K. BELNAP JR.
By Rule and Hoge
Attorneys

Inventors
OLAV BJERING
R. K. BELNAP JR.
By Rule and Hoge
Attorneys

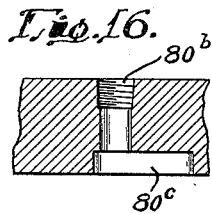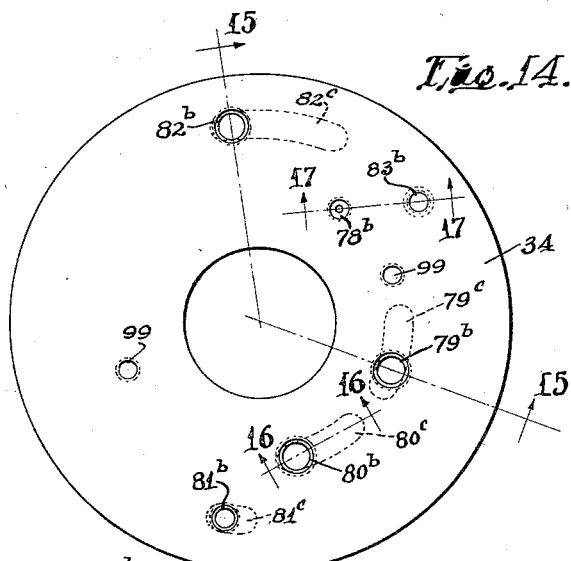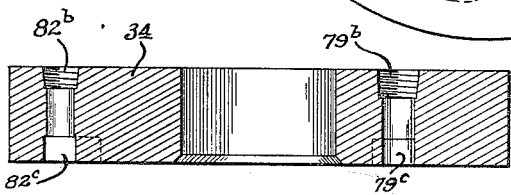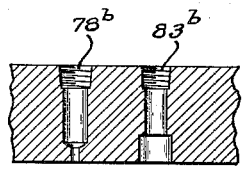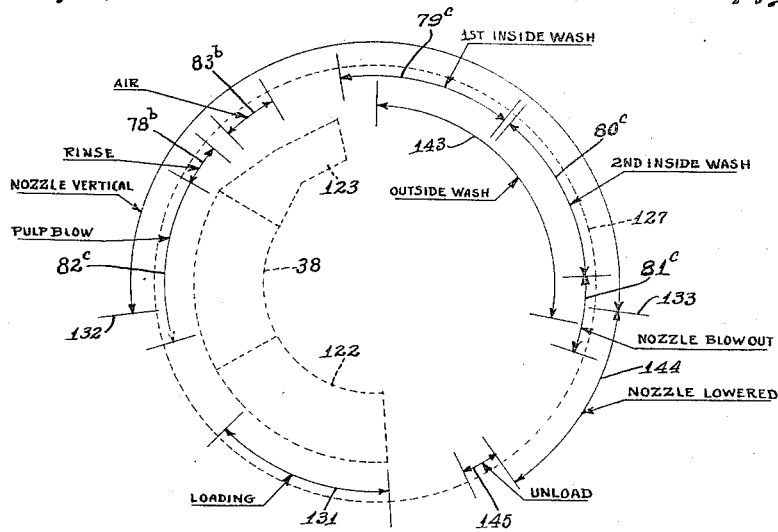

Patented Apr. 8, 1947

2,418,691

UNITED STATES PATENT OFFICE 2,418,691

MACHINE FOR EMPTYING AND WASHING CONTAINERS

Olav Bjering and Robert K. Belnap, Jr., Toledo, Ohio, assignors to Owens-Illinois Glass Company, a corporation of Ohio Application March 14, 1944, Serial No. 526,427

5 Claims. (Cl. 134—81)

Our invention relates to a machine for emptying the contents from bottles, jars, and other containers, and washing and/or rinsing the containers.

An object of the invention is to provide a simple and efficient machine for automatically discharging the contents from jugs, jars, or other containers, and washing or rinsing both the inside and outside surfaces of the containers.

Other objects of the invention will appear hereinafter.

The invention as herein illustrated, is particularly adapted for emptying the contents from jugs or bottles, and is herein described as used for dumping bottles containing tomato pulp, rapidly forcing the contents of the bottles out by air pressure and rinsing the bottles. This particular use is described by way of example, it being understood that the machine is adapted for use with various forms of receptacles containing liquid or semiliquid contents of various descriptions.

Referring to the accompanying drawings:

Fig. 2 is a sectional elevation at the line 2—2 on Fig. 1.

Fig. 3 is a detail view of a valve mechanism for automatically shutting off the water line when the machine is stopped.

Fig. 4 is a sectional elevation at the line 4—4 on Fig. 1.

Fig. 5 is a fragmentary sectional elevation, similar to a portion of Fig. 2, but on a larger scale, showing one of the cradle units for supporting a container, means for tilting the cradle, the spray nozzle, and valve mechanism therefor.

Fig. 14 is a plan view of the stationary valve plate overlying the rotary valve shown in Figs. 10 and 11.

Figs. 15, 16, and 17 are sections at the correspondingly designated section lines on Fig. 14.

Fig. 18 is a chart showing the sequence of operations.

Figure 7:
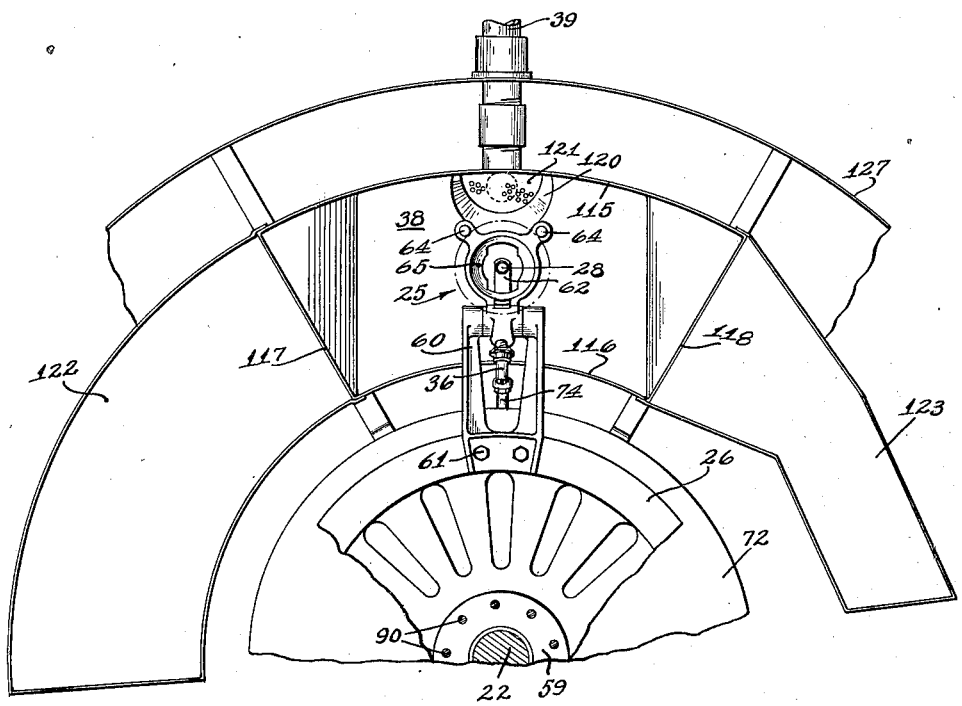
Fig. 7 is a fragmentary, part sectional plan view showing parts illustrated in Fig. 4 including a cradle unit and a tank therebeneath to receive the contents of the container.

The machine comprises, in general terms, a base 20 including a drum-shaped casting 21, a central stationary column 22 secured to and rising from the base, a turret 23 mounted for continuous rotation about said column, a motor 24 having driving connections for rotating the turret, an annular series of cradle units 25 mounted on a spider or table 26 forming part of the turret, each cradle unit comprising means for supporting a bottle 27 or other container and a nozzle 28 through which air under pressure and other fluids are supplied as hereinafter described, a stationary cam track 29 surrounding the drum 21, means 30 providing operating connections between the cam track and the cradle units for tilting the latter, a stationary distributing head 31 on the upper end of the column 22, pipe lines 32 and 33 for supplying water and air respectively to the distributing head, valve mechanism including a stationary valve plate 34 and a rotary valve 35 through which the fluids supplied from the distributing head are conveyed to and through fluid pressure lines comprising hose pipes 36 extending to the spray nozzles 28, nozzles 37 for spraying and rinsing the exterior surfaces of the containers, a tank 38 (Figs. 1, 4 and 7) to receive the contents of the containers, and the discharge pipe 39 through which the material is pumped from the tank.

A more detailed description will now be given.

Figure 1:
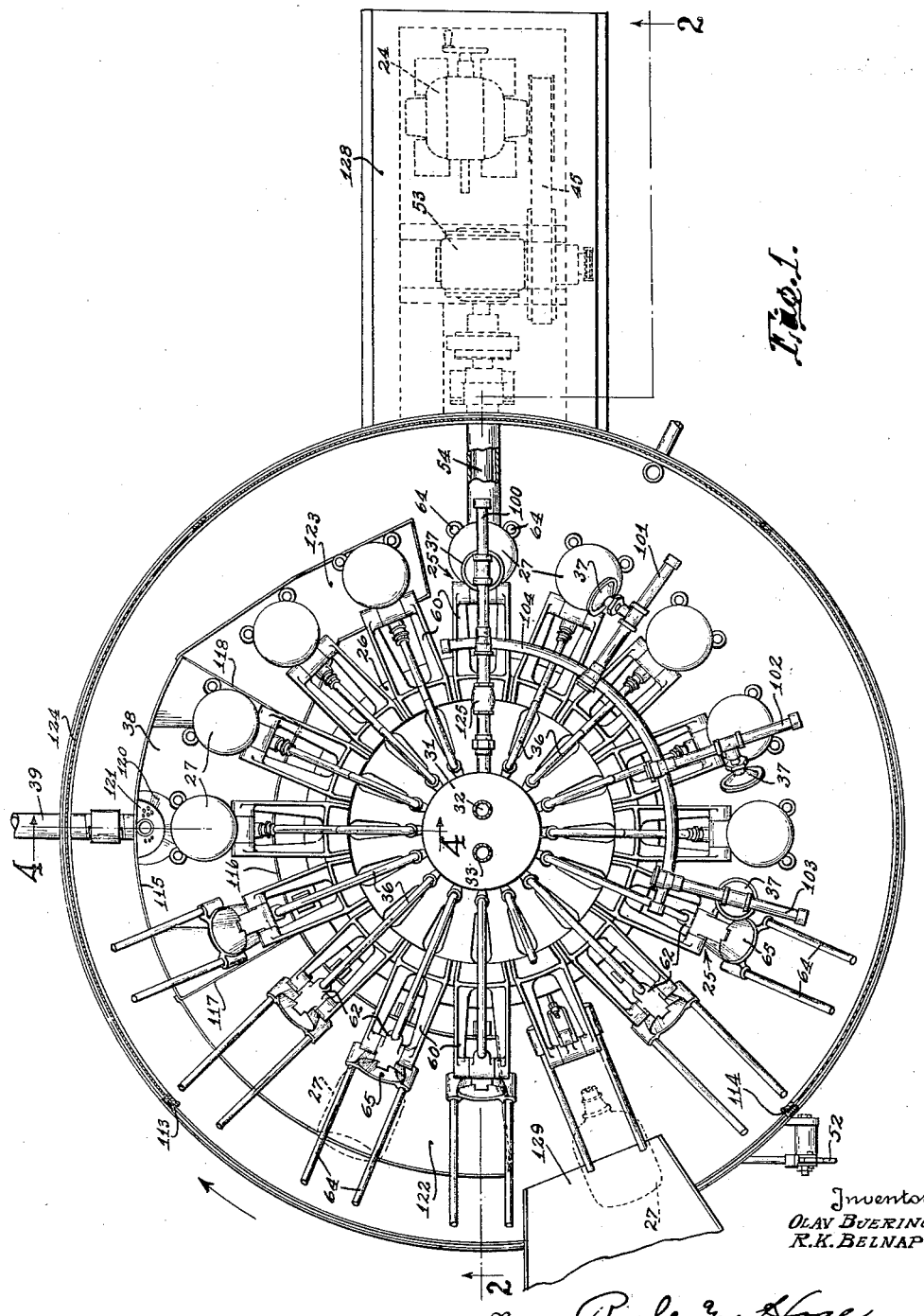
Fig. 1 is a plan view of the machine.

Referring to Figs. 1 and 2, the motor 24 has driving connection with the turret for rotating the latter continuously, through a train of gearing including a belt 45 driving a pulley 46 on a shaft 47 and having driving connection with the shaft through a clutch 48. The clutch is of conventional construction and operated by means including a clutch lever 49 connected to a rock arm 50 on a rock shaft 51 having operating connections with a hand lever 52. The shaft 47 operates through speed reduction gearing within a gear casing 53 to drive a shaft 54 having journal bearings in the machine base. The shaft 54 carries a driving pinion 55 which runs in mesh with a ring gear 56 secured by bolts 57 (Figs. 2 and 5) to the turret 23.

The turret, which is journaled for rotation about the column 22, comprises a cylindrical body 58, the upper end portion of which is of reduced diameter to provide a bearing for the hub 59 of the table 26. The cradle units 25 are pivotally mounted in brackets 60 attached to the table 26 by bolts 61. Each said bracket extends radially outward and is bifurcated to receive the cradle head 62 mounted therein on a horizontal pivot pin 63. The head 62 carries a pair of parallel spaced cradle arms 64. A funnel-shaped spout 65 is secured to the head by screws 66 in position to receive the neck of the container 27 when the latter is supported on the arms 64. The cradle is adapted to be swung from the inclined bottle receiving position shown at the left in Fig. 2 to the vertical position shown at the right in said figure to facilitate the discharge of the contents from the container, and thereafter to be swung to a downwardly and outwardly inclined position for discharging the container from the machine.

Figure 6:
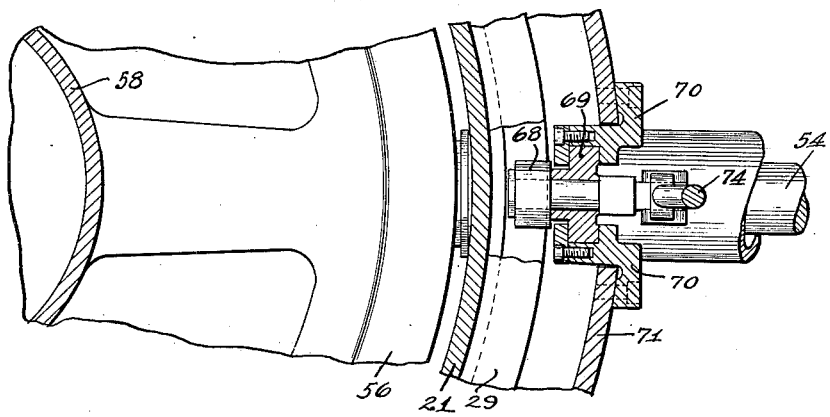
Fig. 6 is a fragmentary sectional view at the line 6—6 on Fig. 5.

The means for swinging the cradles about their pivots includes the stationary cam track 29 which surrounds the drum 21, part or all of which track may be formed integral with the drum. Operating connections between the cam track and cradles include cam follower rolls 68 carried on vertical slide bars 69 (Figs. 5 and 6) mounted for up-an-down movement in guideways formed in guide bars 70. The guide bars are bolted to an annular flange 71 formed on the underside of a roof 72 integral with the body 58 of the turret and braced by webs 73, said roof being positioned over the base member 21. The slide bars 69 are connected to the cradle heads by links 74 pivoted at their upper and lower ends respectively, to the cradle head and slide bar. Said links may be made in sections having screw-threaded connections 74a permitting the link to be adjusted in length, thereby adjusting the cradles about their pivots.

Each cradle unit, as before mentioned, includes a spray nozzle 28 through which both air and water and/or other fluids are supplied to the interior of the bottles 27. Air under pressure is supplied to assist in rapidly ejecting the contents of the container. A small amount of water may then be supplied through the nozzle to more completely empty the container or remove portions of the contents adhering to the container walls. Thereafter when the container has advanced beyond the tank which receives the contents, water and/or other cleaning fluids may be supplied through the nozzle for cleansing the interior surfaces of the container, followed by a puff of air blown through the nozzle for expelling residual water from the pipes preparatory to a succeeding blowing operation.

Figure 9:
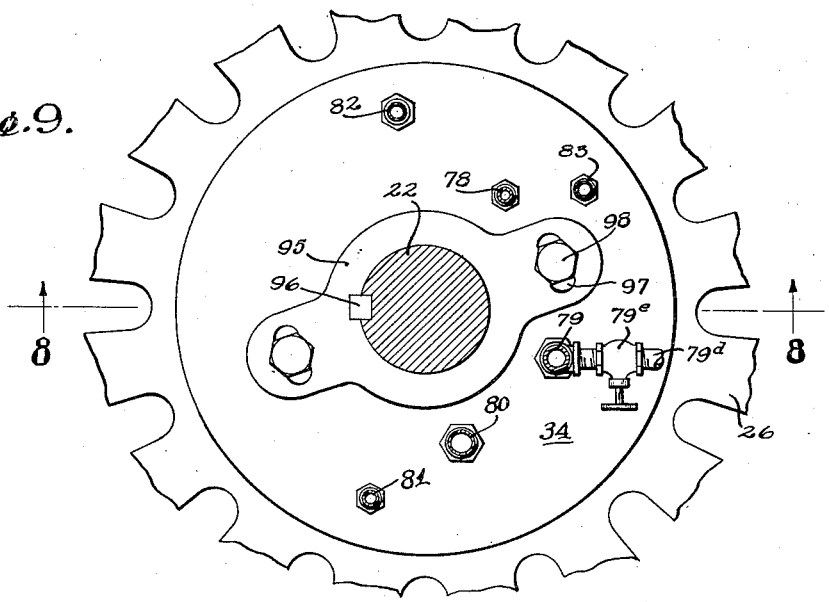
Fig. 9 is a sectional plan at the line 9—9 on Fig. 8.
Figure 12:
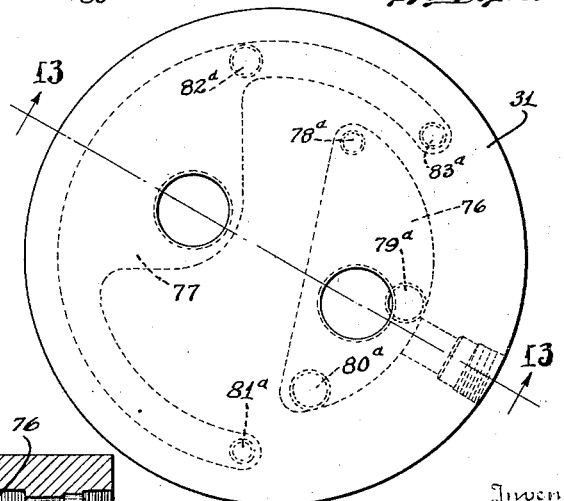
Fig. 12 is a plan view of the distributing head.
Figure 13:
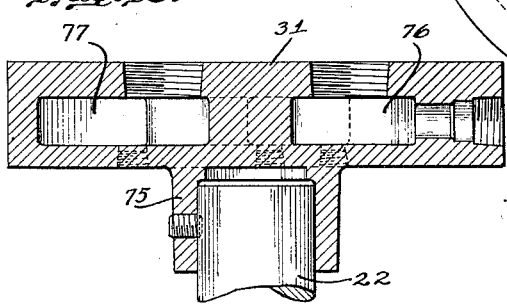
Fig. 13 is a section at the line 13—13 on Fig. 12.

Referring to Figs. 2, 12, and 13, the distributing head 31 is provided with a socket 75 to receive the upper end of the stationary column 22 to which it is keyed. The head is formed with a water chamber 76, and an air chamber 77, to which the water and air pipes 32 and 33 are respectively connected. The head 31 is connected by vertical pipes to the stationary valve plate 34 therebeneath. These pipes include pipes 78, 79, and 80 (see Fig. 9) extending respectively from ports 78a, 79a and 80a in the chamber 76 to ports 78b, 79b and 80b in the valve disk 34 (Figs. 14 to 17), and pipes 81, 82, and 83 extending from ports 81a, 82a and 83a in the air chamber 77 to ports 81b, 82b and 83b in the valve disk 34. Each of said pipes extending between the head 31 and disk 34 is provided with a valve 84 (Fig. 2) for regulating or shutting off the flow of fluid therethrough.

Figure 8:
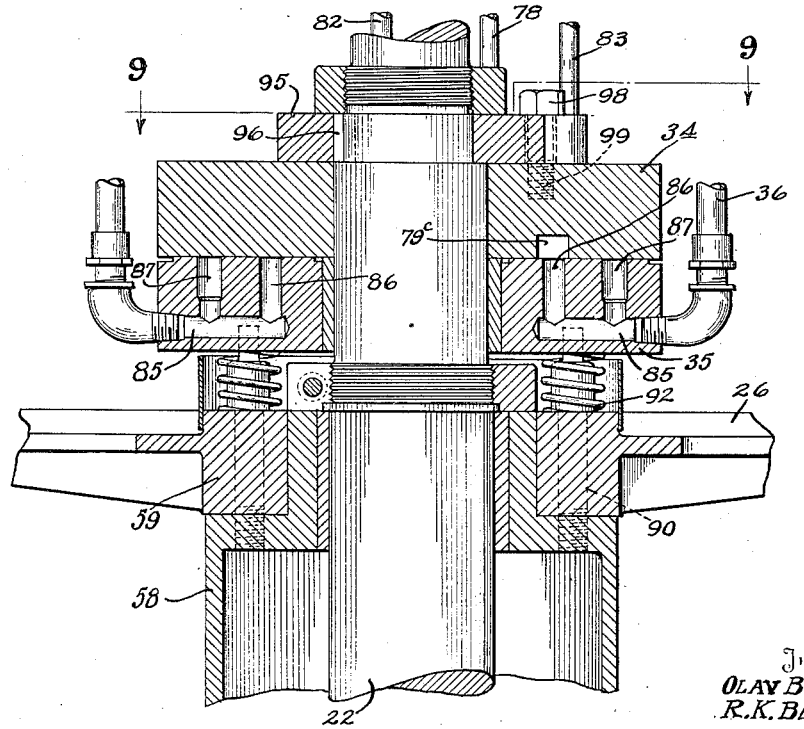
Fig. 8 is a sectional elevation at the line 8—8 on Fig. 9 showing a portion of the valve mechanism.
Figure 10:
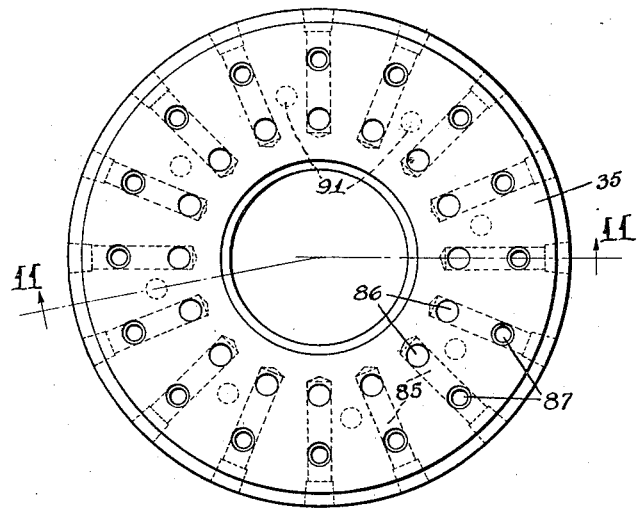
Fig. 10 is a plan view of the main rotating distributing valve.
Figure 11:
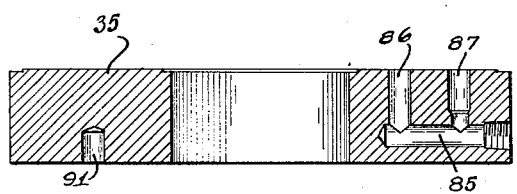
Fig. 11 is a section at the line 11—11 on Fig. 10.

The rotary valve head 35 (Figs. 8, 10, and 11) is provided with an annular series of port openings or channels individual to the cradle units and each comprising a radial bore 85 connecting with vertical port openings 86 and 87. Each said channel 85 is connected to a flexible hose 36 leading therefrom to the corresponding cradle head 62 (Fig. 5) which is formed with a channel 88 extending therethrough and communicating with a pipe 89 forming a part of the nozzle 28. There are thus provided fluid pressure lines extending from the valve head 35 to the nozzles. Each nozzle is provided with a multiplicity of jet openings arranged to direct the fluids against the entire interior surface of the container.

The rotary valve head 35 is attached to the hub 59 for rotation therewith, by means of vertical connecting rods or pins 90 (Fig. 8), the lower ends of which are screwthreaded into the turret 58 and the upper ends of which enter sockets 91 (Figs. 10 and 11) in the valve head 35. Coil springs 92 surrounding the pins 90 are held under compression between the hub 59 and the valve head 35 and serve to hold the valve head against the overlying plate 34. The springs are of sufficient strength to prevent separation of the plates 34 and 35 by the back pressure exerted by the air and water which are being conducted therethrough. The pins 90 also serve to connect the table 26 to the turret for rotation therewith.

The valve plate 34 is secured to the column 22 (Figs. 8 and 9) by means of an adjustment plate 95 secured to the column by a key 96, said plate having elongated openings 97 through which stud bolts 98 extend, said bolts being threaded into openings 99 in the plate 34. This construction permits a limited rotative adjustment of the plate 34, thereby adjusting the time and positions at which the spray nozzles are opened and closed.

Referring to Figs. 8 to 11 and 14, it will be seen that the openings 78b, 79b and 80b in the disk 34, through which water is distributed, are at the same radial distance from the center of the disk as the ports 86 in the valve head 35, so that each of the ports 86 is brought into register with the said ports in the disk 34 as the turret rotates for intermittently supplying water under pressure to the spray nozzles 28. The port 82b (Figs. 14 and 15) opens to an arc-shaped channel or recess 82c in the lower face of the disk for extending the length of time the air line is open through said port. Similar channels 79c and 80c are open to the ports 79b and 80b respectively. The air port opening 81b also has a short extension 81c. The water is supplied at a much greater pressure than the air, and in order to lessen the pressure tending to separate the valve members 34 and 35, the water ports in the valves are accordingly arranged at a shorter radial distance from the valve centers than the air ports. The required length of the water channels 79c and 80c is thus comparatively short and the water pressure tending to separate the valve members 34 and 35 is correspondingly low.

The air and water or other fluid are supplied to the spray nozzles 28 in the following order. As the turret rotates, the port 82b opens the air pressure line to each nozzle 28 after it and the bottle 27 thereon have been swung or while being swung, to a vertical position. Air under pressure is thus supplied through the nozzle and operates to rapidly force the contents, for example, tomato pulp, out of the bottle into the receiving tank 38. After this blowing operation is discontinued, the length of time of blowing being determined by the length of the channel 82c, the port 78ᵇ (Figs. 14 and 17) is brought into register with the port 86 in the water line, so that water under pressure is supplied through the nozzle 28 to spray the inner walls of the container, thus dislodging and ejecting any remaining pulp adhering to the walls. The port 78ᵇ is not extended and is comparatively small so that only a small amount of water is projected into the container. This may be, for example, one or two per cent of the contents of the container.

The port 83ᵇ is next brought into the air line and supplies air under pressure for a brief interval, to complete the ejection of the tomato pulp from the container into the tank 38. The container unit then passes beyond the tank before the port channel 79ᶜ is reached. The latter is then opened to the water line so that water is forced through the spray nozzle 28 for thoroughly rinsing the interior of the container. After passing beyond the channel 79ᶜ, the channel 80ᶜ is opened to the water line, permitting a further rinsing of the container.

The purpose of providing the two ports 79ᶜ and 80ᶜ is to permit the use, if desired, of some washing fluid other than water, through one of said ports, preferably the first port 79ᶜ. Such fluid may be supplied through a branch pipe 79ᵈ (Fig. 9) opening into pipe 79. A valve 79ᵉ is used to close the pipe 79ᵈ when water is being supplied through the distributing head 31 and pipe 79. After the washing and rinsing operations, the port 81ᵇ is opened to the air line for a short period, thereby supplying air under pressure for blowing the water out of the pipes, preparatory to blowing air into a suceeding container.

Means for rinsing the exterior surfaces of the containers includes a series of nozzles 37 (Figs. 1 and 2). These nozzles are connected to pipes 100, 101, 102, and 103 connected by a manifold 104. The pipe 100 is connected to the water chamber 76, so that water is supplied to the nozzles 37 continuously while the machine is in operation. The pipe 100 may be closed or throttled to regulate the flow by means of a valve 105. The nozzles 37 are arranged at various angles and in positions to effectively spray the entire exterior surfaces of the containers.

The water supply is automatically cut off when the machine is stopped, and turned on when the machine is started, by means of an automatic valve 106 (Figs. 2 and 3) in the water line 32. The valve is operated by means including a cam arm 107 connected by a pivot 108 to a bracket 109 and operating through a tappet 110 to lift the valve stem 111 when the arm 107 is swung downward. The arm is connected through a rod 112 to a rock arm 112ᵃ on the shaft 51, which as before described, is rocked by a hand lever 52 and operates the clutch for starting and stopping the machine.

The sanitary tank 38 (Figs. 1, 4, and 7) is positioned directly beneath that portion of the path along which the bottles 27 travel during the time the air pressure is being supplied for ejecting the contents. The tank includes outer and inner walls 115 and 116, end walls 117 and 118, and an inclined bottom 119 for directing the pulp or other material to a trough 120, and thence to the discharge pipe 39 through which the material is continuously pumped. A screen 121 is provided in the trough 120. A valve 121ᵃ operated by a hand lever 121ᵇ, permits the material to be withdrawn from the trough independently of the pipe 39. An inclined trough 122 leads to the one side of the tank 38 for catching the spillage from the bottles as they approach the tank. At the opposite side of the tank is a shallow trough or extension 123 for directing the pulp discharged by the rinsing operation back to the tank.

The main portion of the machine is enclosed by a casing or cover comprising a vertical wall 124 surrounding the major portion of the machine. The ends of this vertical wall may terminate at the vertical frame pieces 113 and 114 (Figs. 1 and 2) which are spaced apart at the intake and discharge side of the machine. The casing includes a top cover 125. A removable central cap or cover 126 is also provided. A pan 127, which underlies the machine and forms part of the machine base, serves to catch the water and other fluids discharged from the nozzles. A casing 128 encloses the motor and parts of the transmission mechanism. The empty bottles are discharged through a chute 129 (Fig. 1).

The timing and sequence of the several steps in the operation of the machine will be understood by reference to the chart (Fig. 18). The operator places the bottles 27 on the cradles as the latter are traversing the loading station, the position and extent of which is indicated by the arc 131. The cradle at the loading station is inclined as shown in Fig. 2, at such an angle that the bottle when placed thereon, slides downwardly into position with the neck of the bottle supported in the spout 65 and the nozzle extending into the bottle. As the loaded cradle passes beyond the loading station, it is gradually swung upward to a vertical position and may remain vertical while it traverses an arc extending from radial line 132 to line 133 which, as shown, comprises somewhat more than half of the complete rotation with the turret. When the bottle reaches a position over the tank 38, the air pressure line is opened to the nozzle through the port channel 82ᶜ as heretofore described, so that the contents of the bottle are forcibly expelled by air pressure supplied through the nozzle. The water line is then opened for a brief interval through the port 78ᵇ for rinsing or loosening any remaining pulp adhering to the walls of the bottle. The air line is then again opened at port 83ᵇ, completing the emptying of the bottle. As the bottle passes beyond the trough 123 into the washing compartment or zone, the nozzle is again opened to the water pressure through the channel 79ᶜ for washing the interior walls of the bottle. When the end of the channel 79ᶜ is reached, the supply of washing fluid is cut off momentarily, and the water line then opened through channel 80ᶜ for a second washing or rinsing. Following the washing operations, the air pressure line is opened at port 81ᶜ for blowing the water out of the nozzle and pipes.

During the washing of the interior of the bottle, the exterior surface is also washed by water supplied through the nozzles 37 positioned at intervals along the path of the bottle, the zone of this outside washing being indicated by the arc 143. After the washing operation, the bottle is swung outwardly, while traveling along the arc 144, to a downwardly and outwardly inclined position which is reached as the bottle is brought to the unloading station at arc 145, so that the empty bottle slides by gravity onto the discharge chute 129.

Modifications may be resorted to within the spirit and scope of our invention.

We claim:

1. The combination of a turret mounted to rotate about a vertical axis, means for rotating the turret, cradles pivotally mounted on the turret for swinging movement about horizontal axes, nozzles carried by said cradles in position to project fluids against the interior wall surfaces of containers supported on the cradles, a water pipe line, means for distributing water supplied through said pipe line to the said nozzles, a valve in said pipe line, means for starting and stopping the turret, and automatic means actuated by said starting and stopping means for opening and closing said valve.

2. The combination of a turret, means for rotating it about an axis, a support on the turret for a container, a nozzle attached to and carried with said support in position to project a fluid within the container while the latter is positioned on the support, a valve mounted to rotate with the turret, a stationary valve disk, said valve and disk having contacting faces, said valve having ports opening through its said face at different distances from said axis, a pipe line extending from said ports to the nozzle, said disk having ports in said face thereof in position to be brought, by the rotation of the valve, into register respectively with the ports in said valve, and means for supplying air and water under pressure to the respective ports in said disk, and thereby supplying air and water through the valve to the nozzle.

3. The combination of a turret mounted for rotation about a vertical axis, means for rotating the turret about said axis, an annular series of spraying units connected to rotate with the turret, each said unit comprising a carrier for a container and a spray nozzle connected to the carrier, a disk valve mounted on the turret for rotation therewith, said valve having an annular series of water ports individual to said units and an annular series of air ports individual to said units, each of said series being arranged concentrically with said axis, a stationary valve disk, said valve and disk having meeting surfaces, means providing a water line and an air line each extending to said stationary disk, the latter having a port through which the water line is opened to the said water ports in succession and a port through which the air line is connected to said air ports in succession as the turret rotates, and pipes individual to said units and each extending from the nozzle of its said unit to the valve disk and opening to the said ports therein for said unit.

4. The combination of a turret mounted for rotation about a vertical axis, means for rotating the turret about said axis, an annular series of spraying units connected to rotate with the turret, each said unit comprising a carrier for a container and a spray nozzle connected to the carrier, a disk valve mounted on the turret for rotation therewith, said valve having an annular series of water ports individual to said units and an annular series of air ports individual to said units, each of said series being arranged concentrically with said axis, a stationary valve disk, said valve and disk having meeting surfaces, means providing a water line and an air line each extending to said stationary disk, the latter having a port through which the water line is opened to the said water ports in succession and a port through which the air line is connected to said air ports in succession as the turret rotates, and pipes individual to said units and each extending from the nozzle of its said unit to the valve disk and opening to the said ports therein for said unit, the ports in the rotary disk being arranged to be brought into communication alternately with said air pressure and water pressure lines as the turrets rotate, whereby air and water are supplied in alternation to the nozzle of each said unit.

5. The combination of a turret mounted to rotate about a vertical axis, means for rotating the turret, cradle units each including a cradle head pivotally connected to the turret to swing about a horizontal axis, a downwardly directed funnel on said head to receive an inverted open-mouthed container, a nozzle attached to the head and projecting upwardly into position to enter the container when the latter is placed on the funnel, arms projecting upwardly from said head, a rotary distributing valve mounted for rotation with the turret, flexible hose connecting said valve with the said cradle heads and communicating with said nozzles, a stationary cam track surrounding the axis of the turret and spaced below said cradle units, slide bars individual to said units and mounted for up-and-down sliding movement on the turret, cam follower rolls carried by said slide bars and running on the cam track, and links connecting the slide bars with said cradle heads, said cam track being shaped and arranged to swing the cradles, as the carriage rotates, from an inclined to an upright position.

OLAV BJERING.
ROBERT K. BELNAP, Jr.

REFERENCES CITED

The following references are of record in the file of this patent:

UNITED STATES PATENTS

| Number | Name | Date |
|---|---|---|
| 2,115,202 | Kimball | Apr. 26, 1938 |
| 2,115,204 | Kimball | Apr. 26, 1938 |
| 555,598 | Donally | Mar. 3, 1896 |
| 755,018 | Laible | Mar. 22, 1904 |
| 736,769 | Parker | Aug. 18, 1903 |
| 881,575 | Gulk | Mar. 10, 1908 |
| 1,805,142 | Hippenmyer | May 12, 1931 |
| 911,320 | Muller | Feb. 2, 1909 |